No. 816,143. PATENTED MAR. 27, 1906.
C. A. ALLEN.
NUT LOCK.
APPLICATION FILED JAN. 30, 1905.
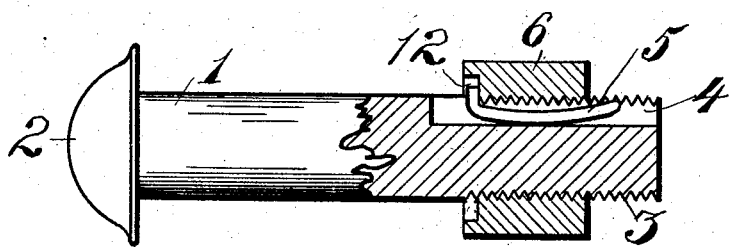
Witnesses:
A. E. Kling
Klenara Fox
Inventor,
C. A. Allen,
by C. E. Humphrey,
Atty.

UNITED STATES PATENT OFFICE.

CHARLES A. ALLEN, OF GALION, OHIO.

NUT-LOCK.

No. 816,143.　　　　Specification of Letters Patent.　　　Patented March 27, 1906.

Application filed January 30, 1905. Serial No. 243,367.

*To all whom it may concern:*

Be it known that I, CHARLES A. ALLEN, a citizen of the United States, residing at Galion, in the county of Crawford and State of Ohio, have invented new and useful Improvements in Nut-Locks, of which the following is a specification.

This invention relates to nut-locks having means to prevent the unintentional revolution of the nut on the threads of the bolt; and the object thereof is to so construct the locking means as to enable the nut to be very quickly applied or removed when necessary.

The invention further aims to provide a nut-lock of approximately universal adaptability with a new and improved holdfast means for the nut, hereinafter more specifically described, said means fixedly securing the nut in position, so that it will not be displaced in any manner, said means being removable as well as reversible and capable of use in connection with various forms of bolts and nuts and for various uses.

The invention further aims to provide a nut-lock of the class referred to with new and improved holding means, said holding means coöperating with both the bolt and nut, said bolt, nut, and holding means being simple in construction, strong, durable, efficient in use, comparatively inexpensive to manufacture, and readily applied to ordinary cases wherein it is desired to securely retain a nut on the threads of a bolt and still be readily capable of removal when the occasion demands.

The invention further aims to provide means to be used in connection with the holdfast means when the space occupied by the threads on the bolt is longer than usual to carry or progressively move forward the holdfast means and constantly maintain the same in operative position with respect to the nut, thereby rendering the holdfast means operative at all times without regard to the position which the nut may assume when engaging the member against which it is ultimately to be locked.

With the foregoing and other objects in view the invention consists of the novel construction, combination, and arrangement of parts constituting my invention to be hereinafter referred to and illustrated in the accompanying drawing, which forms a part of this specification, in which is shown the preferred embodiment of the invention; but it will be understood that changes, variations, and modifications can be resorted to which come within the scope of the claim hereunto appended.

The drawing presented is a side elevation of a bolt with the body portion thereof in section and showing a nut on the threads of the bolt and my improved locking device therefor.

Referring to the drawing, 1 denotes an ordinary bolt provided with a head 2 and having its shank threaded with ordinary machine-threads 3. From the shank end of the bolt 1 through the threads 3 is cut, pressed, or otherwise formed a groove or indentation 4 of sufficient width to contain the holdfast means to be hereinafter more fully described. This holdfast means or locking device for the nut consists of a short piece of spring rod or wire 5, having the major portion thereof curved or bow-shaped with such a radius that when placed in the groove 4 it will seat in the bottom thereof and its upper surface will encounter the points of the threads on the nut 6 at the outer edges thereof. The construction of the bowed body portion of this locking device is such that it will always contact or engage the threads on the nut 6 at two points and will also engage the bottom of the groove 4 at its lower convex central portion, thus providing three points of engagement between itself and the members which it is designed to retain in position. The nut 6 is provided on its forward face, which is the face which is adapted to engage the member which the device is intended to lock or compress, with an annular counterbore or recess 12. The front end of the member 5 is provided with an abruptly-upturned end integral with the bowed portion thereof which is adapted to enter the recess 12 and normally engage the forward face or bottom of this recess at all times when the nut is being driven forward on the threads and when in tight engagement with the member which the nut is arranged to hold in position. By providing the advanced or forward end of the nut 6 with the annular recess 12 the abruptly-upturned end of the locking device 5 is permitted to enter and rest therein without coming in contact with the member or object against which the nut is screwed.

In revolving the nut on the threads 3 the member 5 is prevented from being turned over or displaced by the groove 4, and as the lower face or bottom of the recess 12 is smooth free rotation of the nut is permitted without in any manner displacing the holdfast means 5. The object accomplished in abruptly bending upwardly the forward end of the holdfast means 5 is to enable the nut 6 when driven forward over the threads a considerable distance to carry forward its holdfast means in perfect operative relation with itself, and thereby permit the locking device to remain in such relation to the nut as to cause it to perform its function of locking the same against unintentional revolution at any point on these threads. This is especially advantageous from the fact that some bolts are provided with unusually long threaded ends, and hence if the forward end of the holdfast means was not abruptly turned up, so as to engage the bottom of the recess 12, the nut might travel over and pass out from operative engagement with the holdfast means, and thereby render the same inoperative; but in the construction shown and described the holdfast means 5 is maintained at all times in such a position as to lock the nut 6 against unintentional movement.

What I claim, and desire to secure by Letters Patent, is—

The combination in a device of the class designated, of a bolt provided with a threaded body portion and having a longitudinal groove with the bottom portion thereof parallel with the axis of the bolt extending through the threaded portion thereof, a nut mounted for rotation on the threads of said bolt provided with an annular recess in its forward end, a locking device of spring-wire having its main portion bowed so that the outer ends thereof will engage the outer threads of the nut, and its central convex portion bear against the bottom of said groove, and further having its forward end terminating in a right-angularly-shaped portion adapted to enter said annular recess in said nut and engage the bottom face thereof when said nut is driven forward on said threads, whereby said locking device is progressively carried along said recess in association with said nut and in operative relation therewith, substantially as shown and described.

In testimony whereof I have hereunto set my hand in presence of two subscribing witnesses.

CHARLES A. ALLEN.

Witnesses:
C. E. HUMPHREY,
GLENARA FOX.